UNITED STATES PATENT OFFICE.

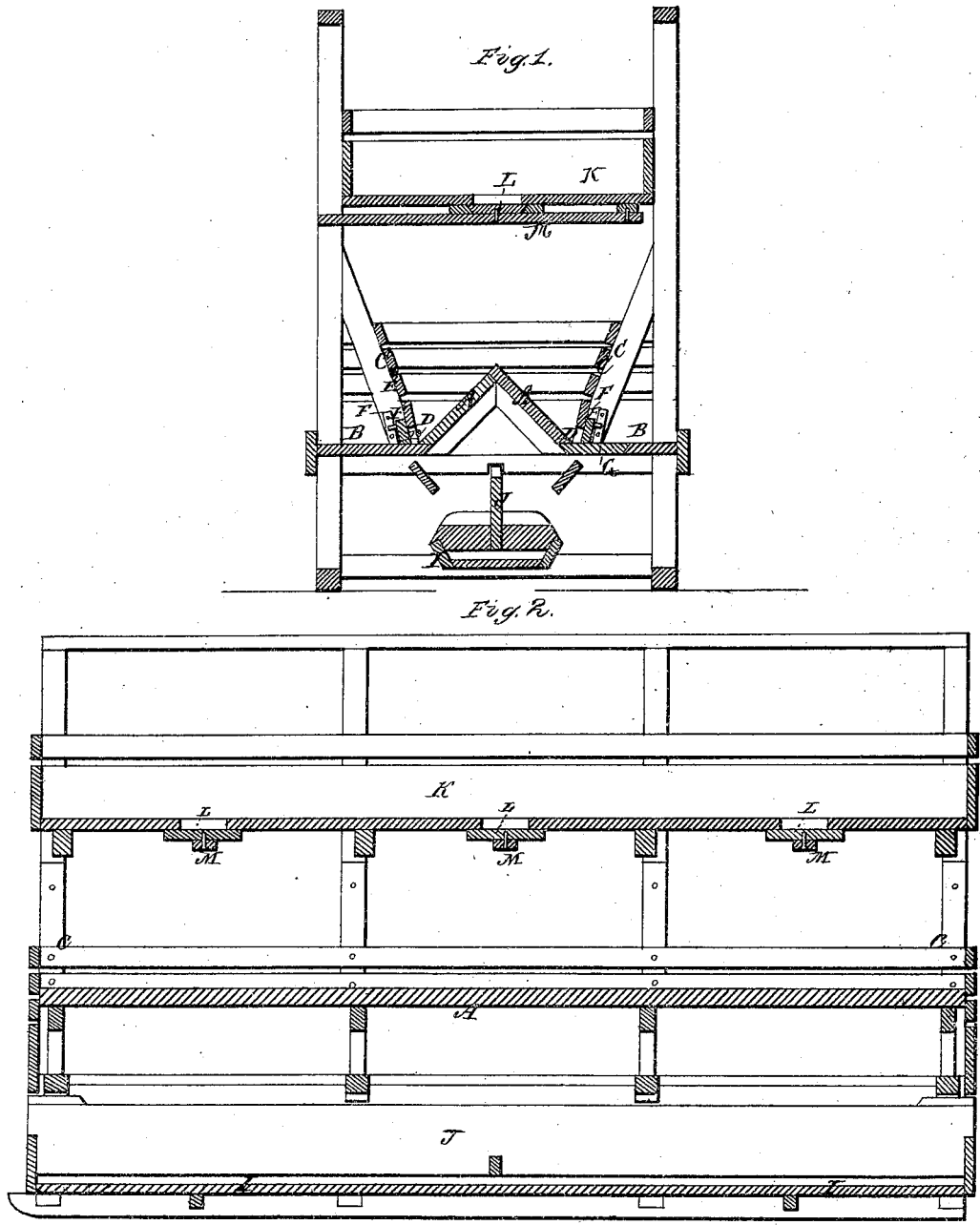

CYRUS M. HALL, OF YATES CITY, ILLINOIS.

IMPROVEMENT IN STOCK-FEEDERS.

Specification forming part of Letters Patent No. 138,801, dated May 13, 1873; application filed March 10, 1873.

*To all whom it may concern:*

Be it known that I, C. M. HALL, of Yates City, in the county of Knox and State of Illinois, have invented certain new and useful Improvements in Combined Crib and Stock-Feeder; and I do hereby declare that the following is a full, clear, and exact description thereof that will enable others skilled in the art to which it appertains to make and use the same, reference being had to the accompanying drawing and to the letters of reference marked thereon, which form a part of this specification.

In the accompanying drawing, Figure 1 is a transverse vertical, and Fig. 2 a longitudinal vertical, section of my combined crib and stock-feeder.

My invention is designed for the better securing, protecting, and conveying to animals any kind of grain or food for fattening purposes or regular feeds, as may be desired, to be operated by the animals or by hand, to suit convenience.

A represents the sloping bottom of the grain-crib, said bottom being inclined downward from the center toward both sides. C C are the inclined sides of the crib, made of horizontal slats and with a continuous (or several small) opening, D, at the bottom, through which the grain is to pass into the troughs B B arranged on each side of the crib. If the grain should at any time become clogged so as not to pass freely down into the opening D, preventing the animals from obtaining the food, one of the slats or boards above the openings is to be moved in sections, it being hung by hinges from the slat or board above, as shown at E, whereby the animal may, by pushing the same in with his nose, loosen the grain and cause it to fall down freely. Over the openings D are placed slides F attached or adjusted in any suitable manner to regulate the size of said opening or close it altogether. By this arrangement the stock-raiser can draw a large or small quantity of the food out into the trough and then close the slides, thus dividing the quantity placed in the troughs and the bulk in the crib, so as to allow the animals to eat only the quantity left in the troughs. In the inner and bottom part of the troughs are made openings provided with slides G to be moved out or in, as desired, for the purpose of conveying the grain from the crib A C through said openings down to a hog or waste-trough I, by the aid of inclined boards fastened to the under part of the frame-work. This trough is provided with a longitudinal vertical divider-board, J, in the center, with an opening between it and the bottom of the trough, leaving the grain to be deposited on one bottom to be obtained by the animals from either side of the dividing-board. This trough slides in suitable ways or guides in the frame-work, so that it can readily be removed and used for the feeding of hogs or other small animals. Above this stock-feeder is attached a chamber or grain-bin, K, for the holding of a greater quantity of grain, to be let down when desired into the feed-rack or crib to be removed by the animals, as above described. In the bottom of the bin K are several openings, each with a slide, L, operated by a lever, M, so as to open the same more or less, as desired, to allow a larger or smaller quantity to pass down into the grain-crib.

Having thus fully described my invention, what I claim as new, and desire to secure by Letters Patent, is—

1. The hinged slats or boards E forming part of the inclined slides C of the grain-crib, for the purposes herein set forth.

2. The sliding-trough I with central divider-board J, constructed as described, in combination with the openings and slides G in the troughs B, substantially as and for the purposes herein set forth.

In testimony that I claim the foregoing I have hereunto set my hand.

CYRUS M. HALL.

Witnesses:
D. W. SHERMAN,
CHAUNCEY HALL.